United States Patent [19]

Bazinet et al.

[11] Patent Number: 5,691,889
[45] Date of Patent: Nov. 25, 1997

[54] CONTROLLER HAVING FEED-FORWARD AND SYNCHRONIZATION FEATURES

[75] Inventors: John P. Bazinet, Concord; John A. O'Connor, Merrimack; John H. Ziegler, Nashua, all of N.H.

[73] Assignee: Unitrode Corporation, Merrimack, N.H.

[21] Appl. No.: 572,171

[22] Filed: Dec. 13, 1995

[51] Int. Cl.$^6$ .................................................. H02M 7/155
[52] U.S. Cl. ........................... 363/89; 363/81; 323/222
[58] Field of Search ................................ 363/79, 80, 81, 363/84, 89; 323/220, 222, 224, 285, 288

[56] References Cited

U.S. PATENT DOCUMENTS

| | | | |
|---|---|---|---|
| 4,353,114 | 10/1982 | Saleh | 363/21 |
| 4,460,951 | 7/1984 | Fenter et al. | 363/49 |
| 4,529,927 | 7/1985 | O'Sullivan et al. | 323/222 |
| 4,616,300 | 10/1986 | Santelmann, Jr. | 363/21 |
| 4,761,722 | 8/1988 | Pruitt | 363/17 |
| 4,825,144 | 4/1989 | Alberkrack et al. | 323/272 |
| 4,885,671 | 12/1989 | Peil | 363/17 |
| 4,888,821 | 12/1989 | Hamp, III et al. | 363/21 |
| 4,942,509 | 7/1990 | Shires et al. | 363/89 |
| 4,974,141 | 11/1990 | Severinsky et al. | 363/81 |
| 5,003,454 | 3/1991 | Bruning | 363/81 |
| 5,034,873 | 7/1991 | Feldtkeller | 363/21 |
| 5,289,361 | 2/1994 | Vinciarelli | 363/80 |
| 5,349,515 | 9/1994 | Megeid | 363/21 |
| 5,355,077 | 10/1994 | Kates | 323/224 |
| 5,367,247 | 11/1994 | Blocher et al. | 323/222 |
| 5,371,667 | 12/1994 | Nakao et al. | 363/124 |
| 5,391,976 | 2/1995 | Farrington et al. | 323/207 |
| 5,450,307 | 9/1995 | Yasumura | 363/47 |
| 5,455,503 | 10/1995 | Kohler | 323/273 |
| 5,457,624 | 10/1995 | Hastings | 363/127 |
| 5,461,301 | 10/1995 | Truong | 323/207 |
| 5,532,918 | 7/1996 | Mayrand et al. | 363/89 |

OTHER PUBLICATIONS

Data sheet, UC1854 High Power Factor Preregulator, *Unitrode Integrated Circuits Corporation*, Feb. 1993, pp. 5-218-5-225..
Data sheet, UC1854A/B Enhanced High Power Factor Preregulator, *Unitrode Integrated Circuits Corporation*, May 1993, pp. 5-226-5-228.
Data sheet LT1249 Power Factor Controller, *Linear Technology*, Jul. 1993, pp. 1-7.

*Primary Examiner*—Adolf Berhane
*Attorney, Agent, or Firm*—Weingarten, Schurgin, Gagnebin & Hayes LLP

[57] ABSTRACT

An integrated circuit controller for a switching power converter implementing feed-forward and synchronization features. The controller IC has pins which permit dual functionality. The feed-forward feature is implemented with a supply voltage from an unregulated auxiliary winding which additionally powers the controller. The synchronization feature is implemented by coupling an external synchronization signal to a feedback pin of the controller IC to which a feedback signal from the output of the converter is also coupled.

4 Claims, 5 Drawing Sheets

CONTROLLER HAVING FEED-FORWARD AND SYNCHRONIZATION FEATURES

FIELD OF THE INVENTION

This invention relates generally to controllers for switching power converters and more particularly, to a controller IC implementing feed-forward and synchronization features.

BACKGROUND OF THE INVENTION

Control circuitry for switching power converters is often implemented on an integrated circuit (IC), or chip. It is sometimes desirable to minimize the number of pins of the IC in order to reduce the required circuit board area. However, it is also advantageous to incorporate multiple functions, or features on the controller IC thus, requiring a balance between the number of pins of the IC and the features provided.

One typical feature of switching power converter controllers is external synchronization, by which the switching frequency of the converter is synchronized to an external signal (hereinafter referred to as a sync signal). The sync signal may be generated by another converter which shares a common load, for example.

Many conventional controller ICs have a $C_T$ input pin to which an external capacitor, sometimes referred to as a timing capacitor, is coupled and an $R_T$ input pin to which an external resistor is coupled for setting a charging or discharging current provided by an internal current source. The timing capacitor is charged and discharged by the internal current source to provide a ramp, or oscillator signal for pulse-width-modulation. When such controllers permit external synchronization, the sync signal is sometimes capacitively coupled to the $C_T$ pin in order to pull the voltage across the timing capacitor high or low, so as to shorten the oscillator cycle. However, this technique requires that a dedicated pin be provided on the controller IC for receiving the external sync signal (even if the timing capacitor were on the chip and the charging current were not adjustable, which would otherwise eliminate the need for the $C_T$ and $R_T$ pins).

Another feature provided in some switching power converter controller ICs is a feed-forward feature, whereby fluctuations in the output voltage of the converter attributable to fluctuations in the converter input voltage are reduced by using a feed-forward signal proportional to the input voltage in order to linearize the gain of the converter. For example, in accordance with one conventional feed-forward scheme, the slope of the ramp waveform used to generate a PWM signal is varied in accordance with the input voltage. One way of generating the feed-forward signal in an AC-to-DC converter is to filter the rectified line voltage and then square the filtered voltage, to provide a signal proportional to the RMS input voltage. However, this technique requires that a dedicated pin be provided on the controller IC in order to receive the feed-forward signal.

SUMMARY OF THE INVENTION

In accordance with the invention, a controller IC of a switching power converter permits dual function use of certain pins. The controller has one pin which receives a supply voltage for powering the controller circuitry. The controller is additionally responsive to the supply voltage for reducing the sensitivity of the converter output to fluctuations in the input voltage (i.e., the supply voltage provides a feed-forward signal). Thus, this pin serves as both a power pin and as a feed-forward pin.

Another pin of the controller IC receives a feedback signal from the output of the converter for purposes of regulating the converter's output. A sync signal is also capacitively coupled to this pin, which thus implements feedback and external synchronization features. A frequency compensation network filters the sync signal so that the sync signal does not affect the converter's regulation.

With this arrangement, the controller IC of the present invention advantageously has a reduced number of pins, such as eight, without sacrificing functionality. Stated differently, the controller IC implements more features than otherwise possible in controller ICs of the same footprint.

Also described is a converter including the controller IC, a power switch for switching an input voltage at a predetermined frequency and duty cycle in response to a drive signal and a smoothing circuit for smoothing the switched voltage to provide a DC output voltage. In one embodiment, the smoothing circuit includes an inductor, a diode and a capacitor and is arranged with the power switch to form a boost converter. An auxiliary circuit responsive to the switched voltage generates the unregulated supply voltage which, as described above, powers the controller and implements a feed-forward feature.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENT

Figure 1:
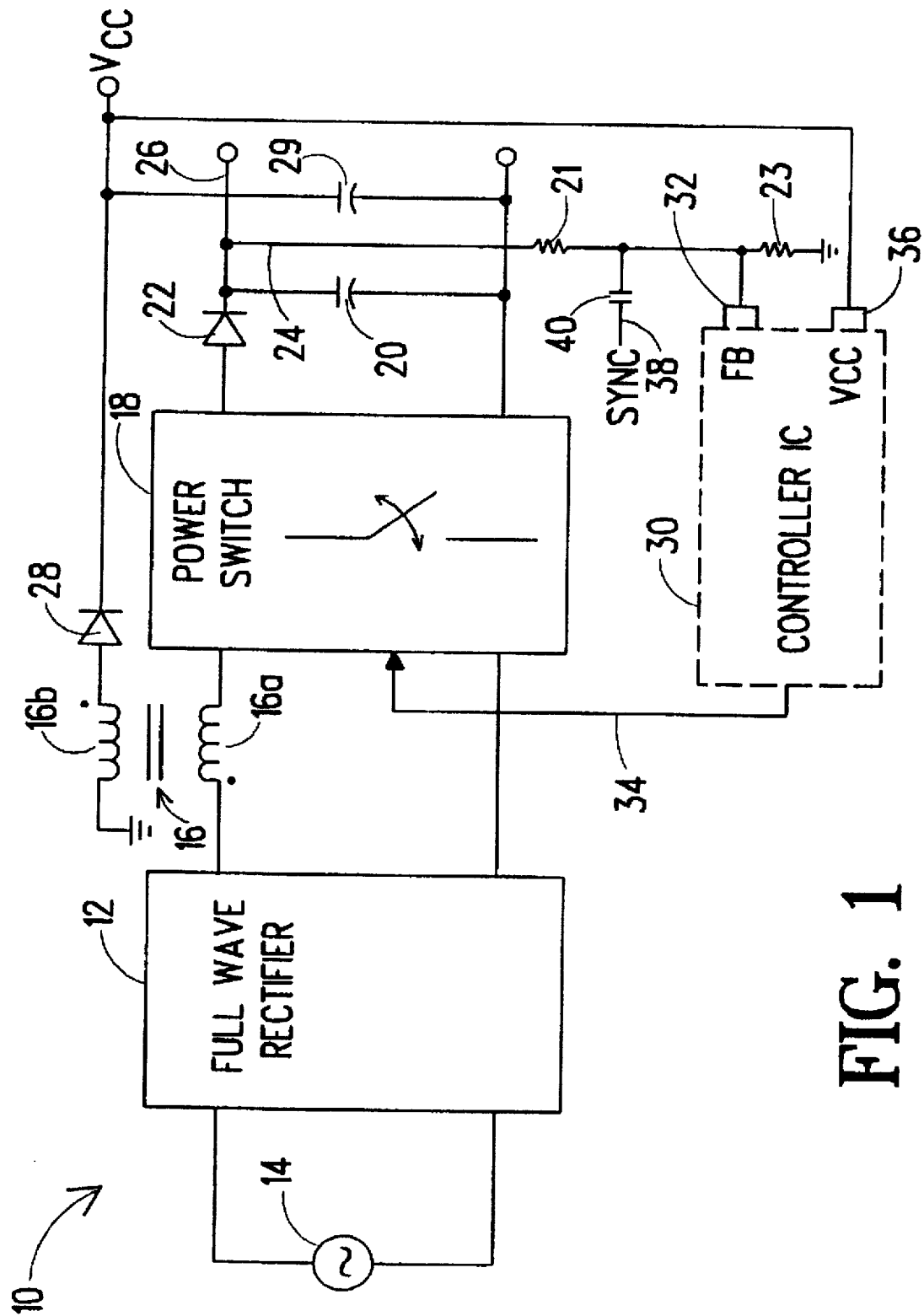
FIG. 1 shows a block diagram of a switching power converter including a controller IC in accordance with the invention.

Referring to FIG. 1, a block diagram of a switching power converter 10 is shown to include a controller IC 30 in accordance with the invention. The controller IC 30 implements feed-forward and synchronization features through pins, or terminals of the chip which have dual functionality. The illustrative converter 10 is a boost converter and includes a full-wave rectifier 12 responsive to an AC input source 14. The full-wave rectifier 12 provides a rectified signal to a winding 16a of an inductor 16. The inductor 16 is further connected to a power switch 18 which switches, or chops the rectified signal in response to a PWM, or drive signal 34 generated by the controller IC 30. The switched signal is further processed by a diode 22 and a capacitor 20 to provide a DC output voltage at an output terminal 26. The inductor winding 16a, diode 22 and capacitor 20 may be considered to provide a smoothing circuit which smoothes the voltage switched by the power switch 18 in order to provide the DC output voltage. It will be appreciated by those of ordinary skill in the art, that the controller IC 30 described herein is also suitable for use with other types of converters, such as buck converters.

A feedback signal 24 is coupled from the output terminal 26 of the converter 10 to a feedback (FB) pin 32 of the controller IC 30 via a resistor divider including resistors 21 and 23 in order to regulate the duty cycle of the power switch 18 so as to maintain a constant, regulated DC output voltage. The feedback signal 24 may have a voltage level proportional to the converter output voltage in accordance with voltage mode control or, alternatively, may have a voltage level proportional to the converter output current in accordance with current mode control. The feedback pin 32 additionally implements a synchronization feature of the converter 10, whereby the switching frequency associated with the power switch 18 is synchronized to an external sync signal 38 which is capacitively coupled to the FB pin 32 of the controller IC through a capacitor 40.

The inductor 16 additionally includes an auxiliary winding 16b coupled to a diode 28 and capacitor 29 for providing an auxiliary supply voltage, referred to hereinafter as $V_{cc}$. The $V_{cc}$ voltage is coupled to a $V_{cc}$ pin 36 of the controller IC 30, as shown, both for powering the circuitry within the controller and for implementing a feed-forward feature (i.e., $V_{cc}$ provides a feed-forward signal). The feed-forward feature may be implemented in various manners within the controller IC. For example, in the illustrative embodiment shown and described below in conjunction with FIG. 2, the feed-forward feature is implemented by a multiplier circuit which additionally implements power factor correction. Alternatively, the feed-forward signal may be used to directly vary the slope of the ramp signal to which an error signal is compared in deriving the PWM signal 34.

Figure 2:
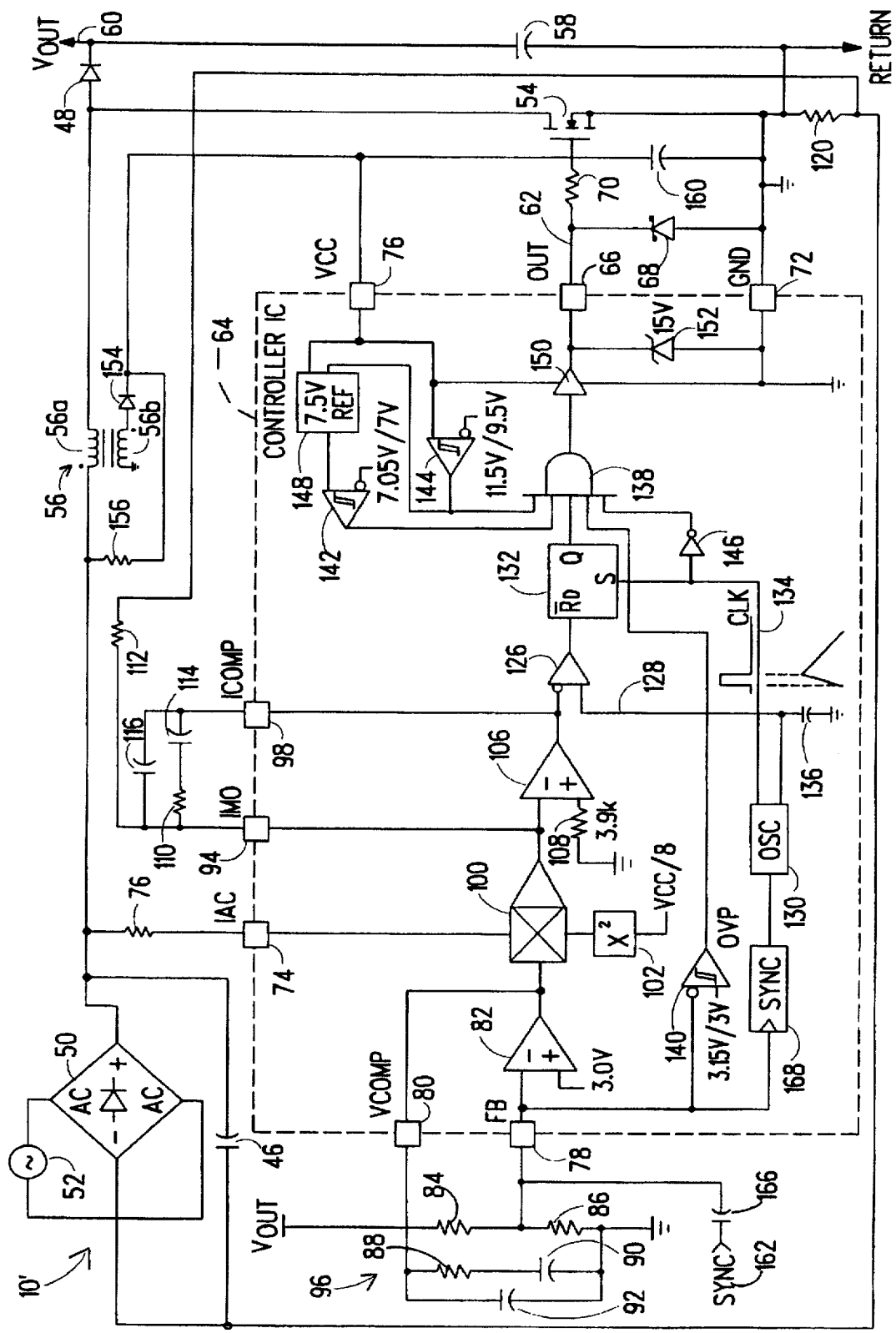
FIG. 2 shows a schematic of one embodiment of the switching power converter and controller IC of FIG. 1.

Referring also to FIG. 2, a schematic of one embodiment 10' of the switching converter of FIG. 1 is shown to include a full-wave rectifier 50 for rectifying an AC input voltage 52 to provide a rectified voltage. A high frequency filter capacitor 46 is coupled across the output of the rectifier 50. A power switch 54 switches the rectified voltage at a predetermined frequency and duty cycle and a smoothing circuit, including a primary winding 56a of an inductor 56, a diode 48 and a capacitor 58 smoothes the switched voltage to provide a DC output voltage at an output terminal 60. In the illustrative embodiment, the power switch 54 is a MOSFET device having a gate terminal to which a PWM, or drive signal 62 is coupled. The drive signal 62 is generated at an output (OUT) pin 66 of a controller IC 64, as will be described. A resistor 70, coupled between the controller output pin 66 and the gate of the power switch 54, controls the rise and fall time of the power switch by limiting its gate drive current. A diode 68 is coupled between the controller output pin 66 and ground, in order to protect the controller IC by preventing this pin from going more than a few tenths of a volt below ground.

The converter 10' additionally includes an auxiliary circuit for generating an auxiliary supply voltage $V_{cc}$. The auxiliary circuit includes an auxiliary, or secondary winding 56b of the inductor 56, a diode 154 connected in series with the inductor winding 56b, and a capacitor 160 connected between the cathode of the diode 154 and ground. A resistor 156, coupled between the cathode of diode 154 and the primary winding 56a of the inductor 56, bootstraps the supply voltage $V_{cc}$ at power up, until the controller IC 64 assumes control of the power switch 54. Supply voltage $V_{cc}$ is provided at the cathode of the diode 154 and is coupled to the controller 64 via a $V_{cc}$ pin 76. Since the supply voltage $V_{cc}$ is not regulated, its voltage level fluctuates in accordance with fluctuations in the AC input voltage. For example, in the illustrative embodiment, the supply voltage $V_{cc}$ can fluctuate between approximately twelve and forty volts.

In the illustrative embodiment, the controller IC 64 has eight pins 66, 72, 74, 76, 78, 80, 94 and 98 and generates the drive signal 62 in response to multiple inputs in order to provide power factor correction, in that the drive signal 62 causes the power switch 54 to switch at a frequency and duty cycle which causes the current through the inductor winding 56a to follow the AC input voltage waveform. With this arrangement, the power factor of the converter 10' is improved. To this end, the controller IC 64 is responsive to a current proportional to the AC input voltage via an IAC pin 74. More particularly, the IAC pin 74 is coupled to the rectified AC input voltage via a resistor 76, as shown. The controller IC 64 is further responsive to a characteristic of the converter output coupled to a feedback (FB) pin 78. In the illustrative embodiment, the feedback characteristic to which the controller IC 64 is responsive is the output voltage which is fed back to the FB pin 78 via a resistor divider including resistors 84 and 86. Alternatively, however, the feedback signal may be proportional to the converter output current provided at output terminal 60.

Additional pins of the controller IC 64 include a VCOMP pin 80 which provides access to the output of an error amplifier 82 for frequency compensation purposes. More particularly, the feedback signal applied to pin 78 is compared by the error amplifier 82 to a reference voltage in order to provide an error signal at the output of such amplifier 82. The VCOMP pin 80 permits external access to the output of the error amplifier 82 so that the components of a frequency compensation network 96 can be coupled between ground and the output of the amplifier 82 in order to ensure stable converter operation. In the illustrative embodiment, the frequency compensation network 96 includes a resistor 88 and capacitors 90 and 92, arranged as shown.

The output of the error amplifier 82 is coupled to a first input of a multiplier 100, which has a second input connected to the IAC pin 74, as shown. A third input to the multiplier 100 is coupled to a squaring circuit 102. The squaring circuit 102 squares a voltage proportional to the supply voltage $V_{cc}$ in order to generate a voltage proportional to the RMS value of supply voltage $V_{cc}$. In the illustrative embodiment, the squaring circuit 102 is responsive to a $V_{cc}/8$ signal and provides a $V_{cc}^2/64$ signal to the multiplier 100.

In operation, the multiplier 100 multiplies the IAC signal at pin 74 by the output of the error amplifier 82 and divides the resulting product by the output of the squaring circuit 102. The output of the squaring circuit 102 serves to implement a feed-forward feature, whereby the sensitivity of the output of the multiplier 100 (and eventually the output of the converter) to fluctuations in the AC input voltage 52 is reduced. This function is able to be achieved with the $V_{cc}$ voltage (as opposed to requiring a separate input pin for connection to a voltage derived directly from the AC source) because the $V_{cc}$ voltage is not regulated and thus, will fluctuate with fluctuations in the AC input voltage 52.

Additional inputs to the controller IC 64 include an IMO pin 94 and an ICOMP pin 98. The IMO pin 94 and the ICOMP pin 98 serve to introduce to the controller IC 64 a signal proportional to the converter output current for use in generating the drive signal 62. This topology is sometimes referred to as a current control loop within a voltage control loop. More particularly, the IMO pin 94 is internally coupled to an inverting input terminal of a current error amplifier 106, the non-inverting input terminal to which is coupled to a resistor 108 to ground. The ICOMP pin 98 is coupled to the output of the current error amplifier 106, as shown. External to the controller 64, the IMO pin 94 and the ICOMP pin 98 are interconnected through a first path including a resistor 110 and a capacitor 114 and through a second path including a capacitor 116. The IMO pin 94 is further coupled to one side of a current sense resistor 120 via a resistor 112, the other side of which is coupled to the return path of the converter and to the source of the power switch 54. With this arrangement, the current sense resistor 120 senses the current through the power switch 54 and feeds a voltage proportional to that current back to the controller IC 64 via the IMO pin 94. The components 110, 114 and 116 coupled between the IMO and ICOMP pins 94 and 98, respectively, serve to frequency compensate the operation of the current error amplifier 106 to ensure operational stability.

The output of the current error amplifier 106 is coupled to the inverting input of a PWM comparator 126. The non-inverting input to the PWM comparator 126 receives a ramp, or oscillator signal 128 from an oscillator circuit 130 and timing capacitor 136, as will be described. Note that in the illustrative embodiment, the timing capacitor 136 is internal to the IC 64, thereby eliminating the need for a dedicated pin for coupling to an external capacitor. The output of the PWM comparator 126 is coupled to the reset input of a flip-flop 132, the set input to which is provided by a clock signal 134 from the oscillator 130. The output of the flip-flop 132 is coupled to a first input of an AND gate 138.

Additional inputs to the AND gate 138 include the output of an overvoltage comparator 140, the output of an $V_{cc}$ undervoltage comparator 144 and the output of a reference undervoltage comparator 142. The $V_{cc}$ pin 76 is internally connected to an input of the $V_{cc}$ undervoltage comparator 144 and to a reference voltage generator 148 which generates a fixed reference voltage, such as the illustrative 7.5V, from $V_{cc}$ for powering the controller circuitry. The output of the $V_{cc}$ undervoltage comparator 144 is coupled to an input of the AND gate 138 and to the reference voltage generator 148, so as to enable the reference voltage generator 148 once the $V_{cc}$ voltage rises above a predetermined threshold. A final input to the AND gate 138 is provided at the output of an inverter 146 in response to the clock signal 134.

In operation, when any of the inputs to the AND gate 138 goes low, the output of the AND gate is inhibited, as is the drive signal 62. The overvoltage comparator 140 detects whether the output voltage, as represented by the feedback signal applied to the feedback pin 78, is greater than a first predetermined threshold voltage, corresponding to a voltage above which the output voltage should not rise. For example, in the illustrative embodiment, the feedback signal rising above 3.15V causes the output of the comparator 140 to go low. The comparator 140 has hysteresis so that the feedback signal must fall below 3.0 V before the output of the overvoltage comparator 140 goes high. The $V_{cc}$ undervoltage comparator 144 compares the supply voltage $V_{cc}$ to a second predetermined threshold voltage. In the illustrative embodiment, when the $V_{cc}$ voltage is less than 11.5V, the output of the comparator 144 is low. Once the $V_{cc}$ voltage rises above 11.5V, the output of comparator 144 goes high and stays high until the $V_{cc}$ voltage falls below 9.5V. The reference undervoltage comparator 142 compares the 7.5V reference voltage to a third predetermined threshold voltage, corresponding to a voltage below which the controller circuitry is not sufficiently powered to ensure proper controller operation. In the illustrative embodiment, the output of comparator 142 is low until the reference voltage reaches 7.05V and thereafter stays high until the reference voltage falls below 7.0V. The purpose of both the $V_{cc}$ undervoltage comparator 144 and the reference undervoltage comparator 142 is to inhibit the drive signal 62 for an interval following power up, until the controller 64 is properly powered.

The output of the AND gate 138 is coupled to a driver 150 which provides the drive signal 62 at an output. A zener diode 152 is coupled between the output of the driver 150 and ground, in order to protect the power transistor 54 by preventing the drive signal 62 from exceeding a predetermined voltage.

The feedback pin 78 is additionally used to implement a synchronization feature, whereby a sync signal 162 is coupled to the feedback pin 78 via a series capacitor 166. Internal to the controller 64, the feedback pin 78 is additionally coupled to a synchronization circuit 168, the output of which is coupled to the oscillator 130 which provides the ramp signal 128 to the PWM comparator 126 and the clock signal 134, as described above. The operation of the converter 10' may be synchronized to the external sync signal 162 as is sometimes desirable. In the illustrative embodiment, the controller 64 is responsive to negative going edges of the sync signal 162 to trigger synchronization. The frequency compensation network 96 serves to low pass filter the sync signal 162, so that the sync signal does not affect the error amplifier 82.

Figure 3:
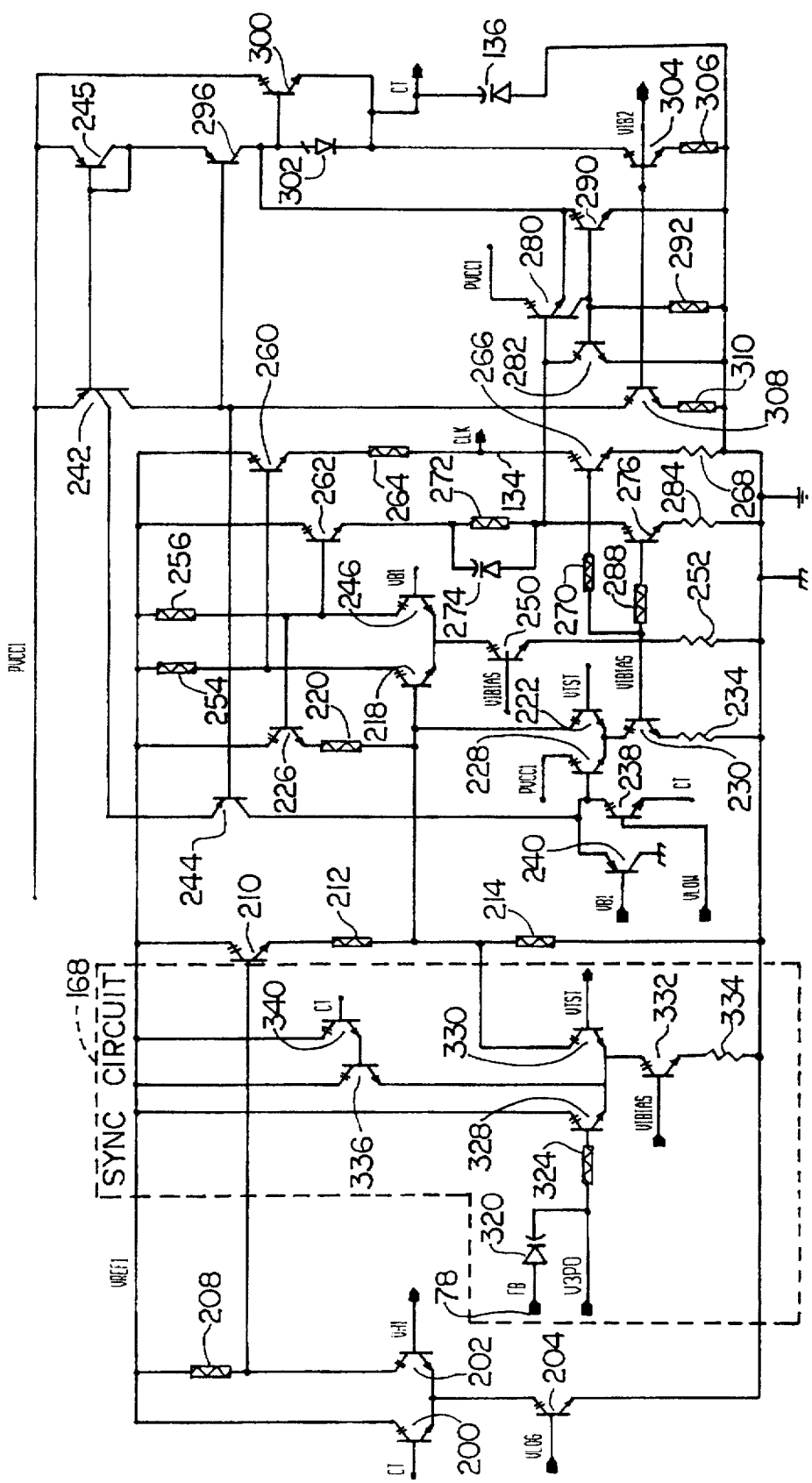
FIG. 3 shows a schematic of the sync and oscillator circuits of the controller IC of FIG. 2.

Referring also to FIG. 3, a schematic of the oscillator circuit 130 and the sync circuit 168 of FIG. 2 is shown. Also shown is the timing capacitor 136 (connected to an internal timing capacitor terminal $C_T$) and the clock signal 134 (CLK) provided by the oscillator circuit 130. Note that the timing capacitor 136 is a junction capacitor, as indicated by its schematic symbol. The portion of the schematic of FIG. 3 other than that labelled sync circuit 168 provides the oscillator circuit 130. The bias voltages and currents labelled in FIG. 3 are generated by the circuit of FIG. 4, as will be described below in conjunction with FIG. 4.

The oscillator circuit 130 includes transistors 200 and 202 arranged as a differential pair with the emitters of such transistors connected to a transistor 204. The base of transistor 204 (labelled VLOG) is connected to the base of a transistor 438 (FIG. 4) to form a current mirror and the base of transistor 202 is connected to a bias voltage VHI, such as 5.5 volts. The base of transistor 200 is connected to the timing capacitor 136. The collector of transistor 202 is connected to the base of a transistor 210 and to a resistor 208 which is further connected to the 7.5V reference voltage (VREF1) generated by the reference voltage generator 148 of FIG. 2. Note the resistors shown in FIG. 3 with a box around the resistor symbol (such as resistor 208) are implant resistors and the remaining resistors are base resistors. However, any conventional technique is suitable for forming the integrated circuit resistors of FIG. 3. The collector of transistor 210 is connected to VREF1 and its emitter is connected to series resistors 212 and 214. The junction between resistors 212 and 214 is connected to the base of a transistor 218, to a resistor 220 and to the collector of a transistor 222. Resistor 220 is further connected to the emitter of a transistor 226, the collector of which is connected to VREF1. Transistor 222 is arranged to form a differential pair with a transistor 228. The collector of transistor 228 is connected to a bias voltage PVCC1 equal to the supply voltage $V_{cc}$ provided at pin 76 of the controller IC 64. The emitters of transistors 222 and 228 are commonly connected to the collector of a transistor 230 which, in turn, has an emitter connected to a resistor 234 to ground. The base of transistor 222 receives a bias voltage (VTST), such as 2.5 volts. The base of transistor 228 is connected to a pair of transistors 238 and 240. More particularly, transistor 238 has a collector connected to the emitter of transistor 240 and further to the collector of a transistor 244. The emitter of transistor 238 is connected to the timing capacitor terminal $C_T$ and the collector of transistor 240 is connected to ground, as shown. The bases of transistors 238 and 240 receive bias voltages VLOW and VB1, such as 1.2 volts and 3.6 volts, respectively. The emitter of transistor 244 is connected to a collector of a transistor 242, the emitter of which is connected to a bias voltage PVCC1 and the base of which is connected to the base of a transistor 245.

Transistor 218 is arranged to form a differential pair with a transistor 246. Transistors 218 and 246 have interconnected emitters, which are further connected to the collector of a transistor 250. The emitter of transistor 250 is connected to a resistor 252 to ground and the base of transistor 250 (labelled VIBIAS) is connected to the base of a transistor 394 (FIG. 4) to form a current mirror. The collectors of transistors 218 and 246 are connected through respective resistors 254 and 256 to the reference voltage VREF1. The collector of transistor 218 is further coupled to the base of a transistor 260. The collector of transistor 246 is coupled to the base of transistor 226 and to the base of a transistor 262.

Transistor 260 operates to provide the clock signal 134 (FIG. 2). More particularly, the emitter of transistor 260 is connected to a resistor 264 which, in turn, is further connected to the collector of a transistor 266. The emitter of transistor 266 is connected to a resistor 268, which is further connected to ground. The base of transistor 266 is connected to the VIBIAS terminal (FIG. 4) through a resistor 270.

The emitter of transistor 262 is connected to a resistor 272 and a capacitor 274, as shown. Resistor 272 and capacitor 274 are further connected to the collector of a transistor 276, to the base of a transistor 280 and to the collector of a transistor 282. The emitter of transistor 276 is connected to a resistor 284 to ground and the base of transistor 276 is connected to the VIBIAS terminal (FIG. 4) through a resistor 288. The base of transistor 282 and an emitter of transistor 280 are connected to the base of a transistor 290 and to a resistor 292 to ground. The emitter of transistor 282 is connected to ground, as shown.

Figure 4:
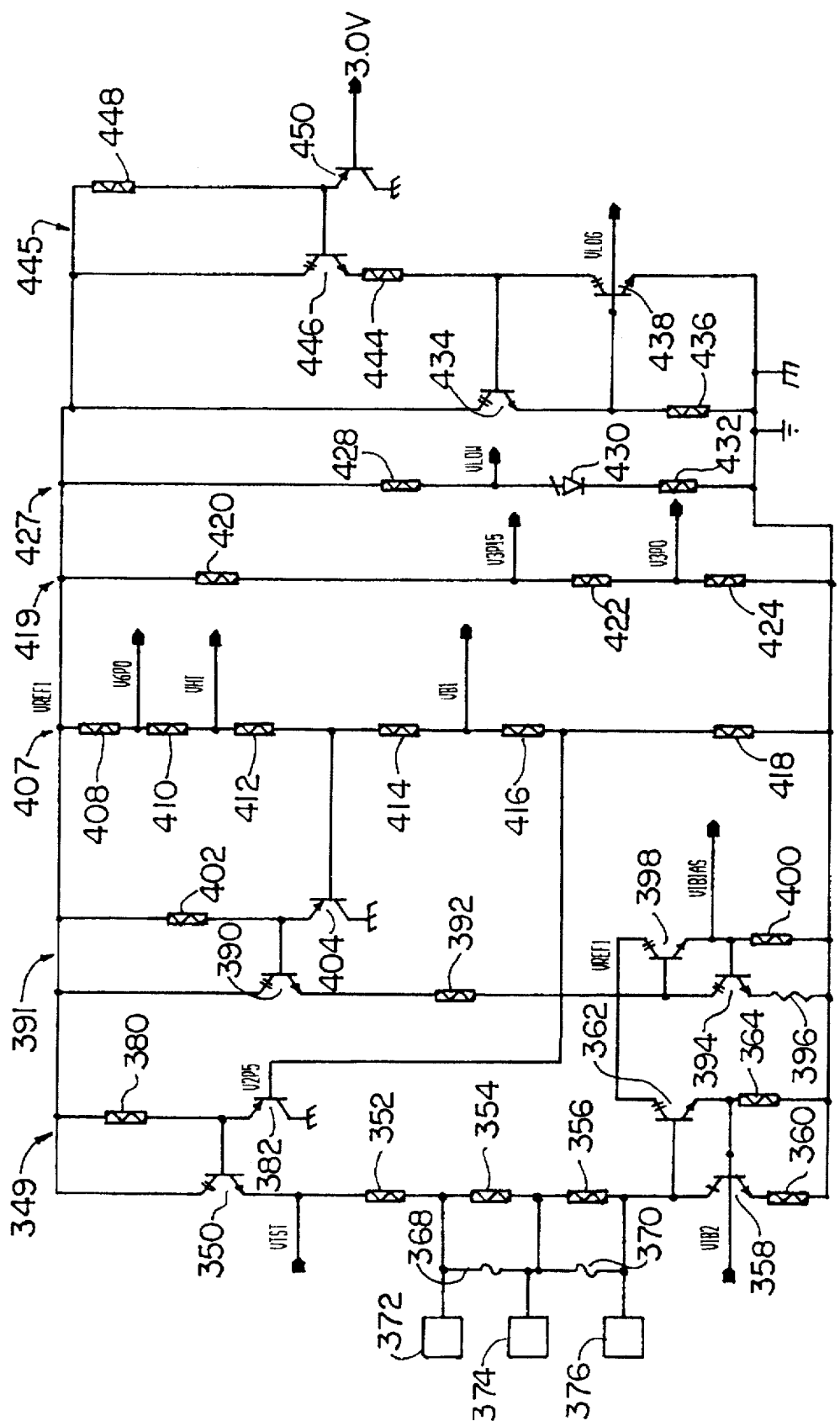
FIG. 4 shows a schematic of a circuit for generating the bias voltages and currents used in the sync and oscillator circuits of FIG. 3.

An output stage of the oscillator includes a transistor 296 having an emitter connected to the collector and base of transistor 245. The collector of transistor 296 is connected to the collector of transistor 290, to the base of a transistor 300 and to a diode 302. The diode 302 is further connected to the emitter of transistor 300, to the timing capacitor 136 and to the collector of a discharging transistor 304 having an emitter connected to a resistor 306 to ground. The base of transistor 304 is connected to the base of a transistor 308 and to a VIB2 terminal (FIG. 4). The emitter of transistor 308 is connected to a resistor 310 to ground and its collector is connected to a collector of transistor 242.

Consider first the operation of the oscillator 130 when external synchronization is not performed (i.e., when a sync signal 162 is not coupled to the controller IC 64). The charging of the timing capacitor 136 is achieved with a current established through transistor 300 and diode 302. More particularly, the current through transistor 304 is mirrored in transistor 308 and additionally flows through transistor 242. A proportional current is mirrored through transistors 245, 296 and diode 302. The current through diode 302 mirrors current to transistor 300 which supplies current to the timing capacitor 136. Once the voltage across the timing capacitor 136 reaches a predetermined maximum voltage, such as 5.5 volts in the illustrative embodiment, the current through transistor 296 is diverted away from diode 302 and the timing capacitor 136 by transistor 290, so as to permit the timing capacitor to discharge to a predetermined minimum voltage, such as 0.5 volts in the illustrative embodiment.

Once the voltage across the timing capacitor 136 has reached 5.5V, transistor 200 dominates the differential pair including transistors 200 and 202 (since the base of transistor 202 is at 5.5V). Thus, transistor 202 ceases to conduct, thereby causing the base of transistor 210 to be pulled up toward the VREF1 reference voltage of 7.5 volts. Such base voltage causes transistor 210 to conduct and to pull up the base of transistor 218. More particularly, under this condition, the base of transistor 218 is at a voltage greater than the 3.6 volts at which the base of transistor 246 is held. Thus, transistor 218 will dominate the differential pair including transistors 218 and 246. With transistor 218 conducting, the base of transistor 260 is pulled low, thus level shifting the clock signal 134 at the collector of transistor 266 low.

With transistor 246 off, the bases of transistors 226 and 262 are pulled up. With this arrangement, transistor 226 conducts to supply additional base drive current to transistor 218, so as to latch transistor 218 on. Such latching of transistor 218 is desirable in order to prevent the oscillator from ceasing to discharge the timing capacitor 136 until the voltage across the timing capacitor 136 has fallen to 0.5 volts. This is achieved by keeping transistor 218 on, via the base drive current supplied by transistor 226, until the voltage across the timing capacitor 136 falls to 0.5 volts.

With transistor 262 on, transistors 280, 282 and 290 are likewise turned on. With this arrangement, the mirrored current through transistor 296 is diverted away from diode 302 and the timing capacitor 136 through transistor 290 to ground. In this way, the timing capacitor 136 is permitted to discharge through transistor 304 and resistor 306.

Once the voltage across the timing capacitor 136 falls below 5.5 volts, transistor 202 begins to dominate the differential pair including transistors 200 and 202. More particularly, transistor 200 turns off and transistor 202 turns on. Conducting transistor 202 has the effect of pulling the base of transistor 210 low, so as to turn off transistor 210. With transistor 210 off, there is no other source of base drive current for transistor 218 other than transistor 226. Once the voltage across the timing capacitor 136 falls to approximately 0.5 volts, transistor 238 becomes forward biased. Conducting transistor 238, in turn, causes transistor 228 to turn off and thereby permits transistor 222 to pull the base of transistor 218 low through transistor 222, transistor 230 and resistor 234, thereby turning off transistor 218.

Once transistor 218 is off, transistor 260 turns on which causes the clock signal 134 to be pulled high. Also, under these conditions, transistor 246 is on, causing the bases of transistors 262 and 226 to be pulled low. With transistor 262 low, transistors 280, 282, and 290 are turned off. Thus, the path through which the current of transistor 296 was previously diverted is no longer available. This results in the current through transistor 296 turning on transistor 300 and diode 302 which then charge the timing capacitor 136.

Consider now the case where it is desired to synchronize the oscillator 130 to an external sync signal 162 (FIG. 2). Recall from FIG. 2 that the sync signal 162 is coupled to the feedback pin 78 of the controller chip 64 via a capacitor 166. The feedback pin 78 is further coupled to an internal capacitor 320 of the sync circuit 168. The capacitor 320 is further coupled to a resistor 324 and to a bias voltage V3P0 of 3.0 volts. Resistor 324 is further coupled to the base of a transistor 328 which forms a differential pair with a transistor 330. The commonly connected emitters of transistors 328 an 330 are connected to the collector of a transistor 332 and to a darlington pair including transistors 336 and 340, as shown. The emitter of transistor 332 is connected to a resistor 334 to ground and its base is connected to the VIBIAS terminal. The base of transistor 340 is connected to the timing capacitor 136 and the base of transistor 330 is connected to a bias voltage labelled VTST, such as 2.5 volts. The collector of transistor 330 is connected to the base of transistor 218.

In operation, the feedback signal 162 (FIG. 2) capacitively coupled to pin 78 is summed with the 3.0 volt bias voltage for coupling to the base of transistor 328. Recall that in the illustrative embodiment, synchronization is triggered by the negative going edges of the sync signal 162. Upon the occurrence of a negative going pulse, transistor 328 will turn off and transistor 330 will conduct. Conducting transistor 330 pulls the base of transistor 218 low, so as to turn off transistor 218 and terminate the discharging of the timing capacitor 136 as described above. In this way, negative edges of the sync signal 162 have the effect of terminating the oscillator signal cycle.

In between negative going edges of the sync signal 162, transistor 328 is on and conducts most of the current through transistor 332, causing transistor 330 to be off. Thus, during these intervals between negative going pulses, the base of transistor 218 is not affected by sync circuit 168 and the timing capacitor 136 is permitted to be discharged.

Referring also to FIG. 4, a bias generator circuit for generating the bias voltages and currents of FIG. 3 is shown. The bias generator circuit includes three resistor dividers 407, 419 and 427 connected between the reference voltage VREF1 and ground. The first resistor divider 407 includes series connected resistors 408, 410, 412, 414, 416 and 418. The voltage at the junction of resistors 408 and 410 is labelled V6PO and has a nominal value of 6.0V. The voltage at the junction of resistors 410 and 412 is labelled VHI and has a nominal value of 5.5V. The voltage at the junction between resistors 414 and 416 is labelled VB1 and has a nominal value of 3.6V. The second resistor divider 419 includes resistors 420, 422 and 424. The voltage between resistors 420 and 422 is labelled V3P15 and has a nominal value of 3.15V and the voltage between resistors 422 and 424 is labelled V3PO and has a nominal value of 3.0V. Finally, resistor divider 427 includes resistors 428 and 432 and a diode 430 connected as shown. The voltage at the junction between resistor 428 and diode 430 is labelled VLOW and has a nominal value of 1.2V.

Also provided in the bias generator circuit of FIG. 4 are three current mirror arrangements 349, 391 and 445 for establishing currents which are mirrored in the oscillator circuit of FIG. 3. Considering first the current mirror 349, a transistor 382 has a base connected to the junction between resistors 416 and 418, labelled V2P5 which has a nominal value of 2.5V. The collector of transistor 382 is grounded and its emitter is connected to a resistor 380 and to the base of a transistor 350. The resistor 380 and the collector of the transistor 350 are further connected to the VREF1 voltage. The emitter of transistor 350 is connected to the VTST terminal as well as to a resistor string including series-connected resistors 352, 354 and 356. Resistor 356 is further connected to the collector of a transistor 358, the emitter of which is connected to ground through a resistor 360. The base of transistor 358 provides a VIB2 terminal which is connected to the oscillator circuit of FIG. 3, as well as to the junction between a resistor 364 and the emitter of a transistor 362, as shown. The collector of transistor 362 is connected to the VREF1 voltage and its base is connected to the collector of transistor 358, as shown.

In operation, the current mirror 349 establishes the charging current for charging the timing capacitor 136 (FIG. 3) as well as the discharging current for discharging the timing capacitor. This is achieved by establishing the voltage VIB2 which sets the current through transistor 304 (FIG. 3) which discharges the timing capacitor 136. The current through transistor 304 is mirrored through transistor 308 and flows through transistor 242. The current through transistor 242 is mirrored through transistor 245 and flows through transistor 296. The resulting current through transistor 300 and diode 302, which charge the timing capacitor 36, is thus proportional to the current through transistor 304. For example, in the illustrative embodiment, the current through transistor 308 is twice the current through transistor 304, the current through transistor 245 equals the current through transistor 242 and the current through transistor 300 is nine times the current through diode 302. With this arrangement, the charging current through transistor 300 and diode 302 is twenty times greater than the discharging current through transistor 304.

The 2.5V at the base of transistor 382 also appears at the emitter of transistor 350 is at 2.5V which is a $V_{eb}$ and a $V_{be}$ drop away from the base of transistor 382. Thus, the VTST terminal is nominally at 2.5V. This voltage establishes a current through resistor 352 and optionally through resistors 354 and 356 in accordance with the value of such resistors.

The charging and discharging currents can be adjusted by adjusting the values of resistors 352, 354 and 356. Resistors 354 and 356 have corresponding fuses 368 and 370 in parallel therewith and thus, serve as trimming resistors for fine tuning the value of the resistor 352. To this end, trimming nodes 372, 374 and 376 permit access to the terminals of fuses 368 and 370. When the value of resistor 352 is equal to or higher than the desired value, the fuses 368 and 370 are left intact. Whereas, when the value of the resistor 352 is lower than desired, one or both of the fuses 368 and 370 will be blown by access through terminals 372, 374, 376 in order to provide resistor(s) 354 and/or 356 in series with resistor 352.

The current through resistors 352, 354 and 356 flows through transistor 358 and establishes the base voltage VIB2 of transistor 358. Recall that the VIB2 terminal is connected to the oscillator circuit of FIG. 3 and specifically, to the base of transistors 304 and 308 so as to establish the charging and discharging currents for the timing capacitor 136 as described above. Thus, the current through transistor 358 is mirrored through transistors 304 and 308. The transistor 362 serves to source current to the bases of transistors 304 and 308.

The second current mirror 391 includes transistors 390, 394, 398 and 404, as well as resistors 392, 396, 400 and 402. The base of transistor 404 is connected to the junction of resistors 412 and 414 and receives a nominal voltage of 5.1V which also appears at the emitter of transistor 390. The value of resistor 392 establishes a current therethrough and through the transistor 394. The base of transistor 394 is connected to the VIBIAS terminal which is further connected to the oscillator circuit of FIG. 3. Specifically, the VIBIAS terminal is connected to the base of transistors 230, 266, 276 and 332 of the oscillator of FIG. 3. With this arrangement, the current through transistor 394 is mirrored through transistor 230, 266, 276 and 332. Transistor 398 is provided to source base current to such transistors of the oscillator circuit.

The last current mirror 445 includes transistors 434, 438, 446 and 450, as well as resistors 436, 444 and 448, connected as shown. The base of transistor 450 receives a 3.0V bias voltage which also appears at the emitter of transistor 446. Such voltage establishes a current through transistor 438 which, in turn, sets up the base voltage of transistor 438 which provides the VLOG voltage, for connection to the oscillator circuit. Specifically, the VLOG terminal is connected to the base of transistor 204 of the oscillator circuit of FIG. 3. Thus, the current through transistor 438 is mirrored through transistor 204. Transistor 434 is arranged to source base current to the transistor 204 of the oscillator circuit.

Figure 5:
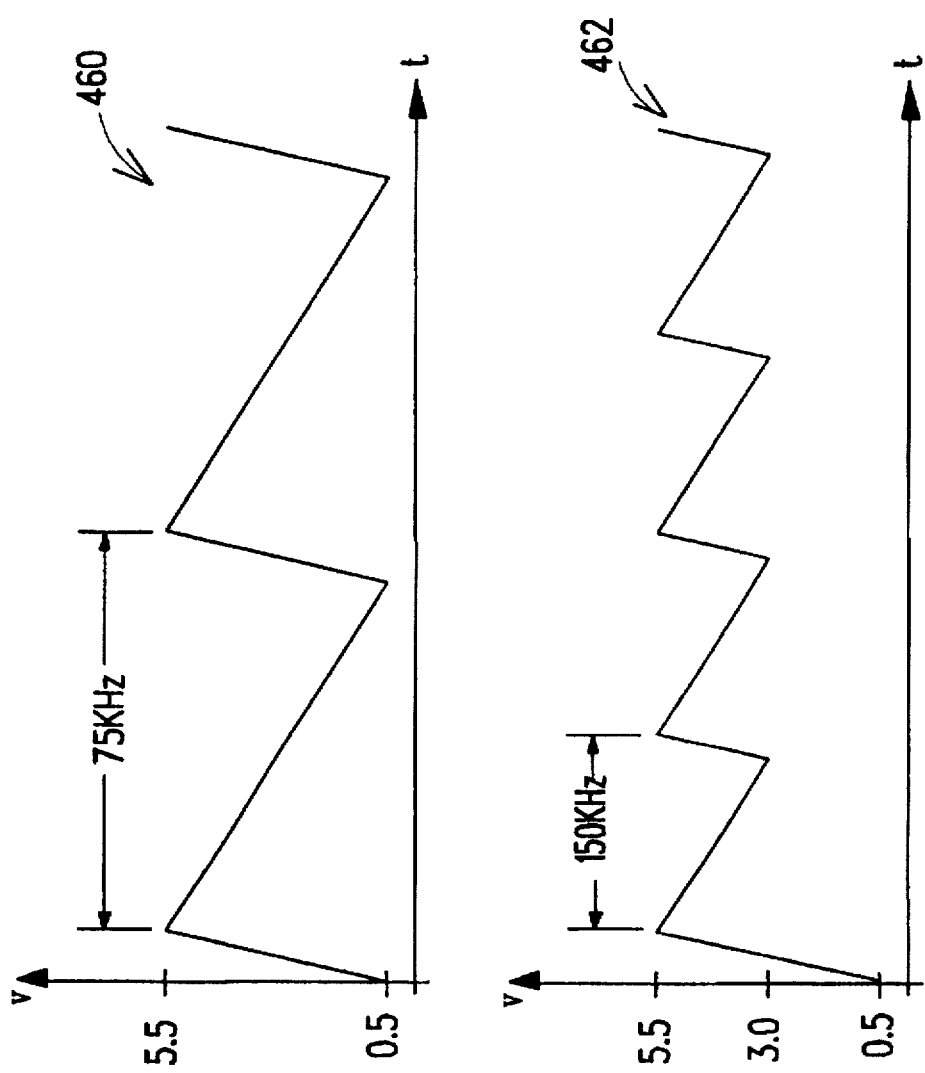
FIG. 5 shows illustrative waveforms associated with synchronization of the converter of FIG. 2.

Referring also to FIG. 5, illustrative oscillator signal waveforms are shown. The first waveform 460 corresponds to the voltage across the timing capacitor 136 when no external synchronization is performed. In this case, the capacitor 136 will charge up to approximately 5.5 volts and discharge to approximately 0.5 volts at a rate set by the value of the internal timing capacitor 136 and charging and discharging currents. In the illustrative embodiment, the oscillator signal has a frequency of approximately 75 KHz.

The waveform labelled 462 illustrates the voltage across the timing capacitor 136 when the oscillator is externally synchronized to a sync signal 162 having a frequency which is twice the internal clock frequency of the controller IC 64. With this arrangement, each time the timing capacitor 136 discharges to approximately 3.0 volts, the oscillator cycle is terminated and the capacitor is charged. Thus, the resulting voltage across the timing capacitor 136 has a frequency equal to twice the frequency of the waveform 460, or approximately 150 KHz in the illustrative embodiment.

Having described the preferred embodiments of the invention, it will now become apparent to one of skill in the art that other embodiments incorporating their concepts may be used. It is felt therefore that these embodiments should not be limited to disclosed embodiments but rather should be limited only by the spirit and scope of the appended claims.

We claim:

1. A converter comprising:
   a power switch for switching an input voltage at a predetermined frequency and duty cycle in response to a drive signal;
   a smoothing circuit coupled to said power switch for smoothing said switched voltage to provide a DC output voltage and an output current; and
   a controller circuit having an input terminal to which a feedback signal and a synchronization signal are coupled, said feedback signal being representative of said DC output voltage or said output current, said synchronization signal being coupled to said input terminal of said controller circuit through a capacitor.

2. The converter recited in claim 1 wherein said controller circuit comprises an error amplifier having an input coupled to said input terminals, and wherein said converter further comprises a feedback network coupled to said input terminal, wherein said feedback network filters said synchronization signal.

3. A converter of the type including a power switch responsive to a drive signal for switching an input voltage, and a smoothing circuit coupled to said power switch for smoothing said switched voltage to provide a DC output voltage and an output current, said converter comprising:
   a controller circuit having an input terminal to which a feedback signal and a synchronization signal are coupled, said feedback signal being indicative of said DC output voltage or said output current, said synchronization signal being coupled to said input terminal of said controller circuit through a capacitor.

4. The converter recited in claim 3 wherein said controller circuit comprises an error amplifier having an input coupled to said input terminal, and wherein said converter further comprises a feedback network coupled to said input terminal, wherein said feedback network filters said synchronization signal.

* * * * *